United States Patent [19]

Smith et al.

[11] Patent Number: 5,330,686
[45] Date of Patent: Jul. 19, 1994

[54] TEMPERATURE STABLE AND SUNLIGHT PROTECTED PHOTOCHROMIC ARTICLES

[75] Inventors: Robert A. Smith; Barry Van Gemert, both of Murrysville, Pa.

[73] Assignee: PPG Industries, Inc., Pittsburgh, Pa.

[21] Appl. No.: 932,172

[22] Filed: Aug. 19, 1992

[51] Int. Cl.⁵ ............................ G02B 5/23; C08K 5/34
[52] U.S. Cl. ........................................ 252/586; 524/89
[58] Field of Search .................... 524/89; 252/582, 586

[56] References Cited

U.S. PATENT DOCUMENTS

| | | | |
|---|---|---|---|
| 3,764,477 | 10/1973 | Lehmann et al. | 195/63 |
| 4,408,016 | 10/1983 | Eads et al. | 525/277 |
| 4,637,698 | 1/1987 | Kwak et al. | 351/163 |
| 4,720,547 | 1/1988 | Kwak et al. | 252/586 |
| 4,913,544 | 4/1990 | Rickwood et al. | 252/586 |
| 4,931,219 | 6/1990 | Kwiatkowski et al. | 252/586 |
| 4,931,220 | 6/1990 | Haynes et al. | 252/586 |
| 4,931,220 | 6/1990 | Haynes et al. | 252/586 |
| 4,935,330 | 6/1990 | Hoffman et al. | 430/281 |
| 4,968,454 | 11/1990 | Crano et al. | 252/586 |
| 5,000,878 | 3/1991 | Chu | 252/587 |
| 5,098,974 | 3/1992 | Kania et al. | 526/310 |

FOREIGN PATENT DOCUMENTS

| | | |
|---|---|---|
| 0227337 | 7/1987 | European Pat. Off. . |
| 0453149 | 10/1991 | European Pat. Off. . |
| 62-11743 | 1/1987 | Japan . |
| 63-199279 | 8/1988 | Japan . |
| WO90/06539 | 6/1990 | PCT Int'l Appl. . |
| 2229189 | 9/1990 | United Kingdom . |

*Primary Examiner*—Philip Tucker
*Attorney, Agent, or Firm*—Frank P. Mallak; Irwin M. Stein

[57] ABSTRACT

Described is a photochromic composition which is a polymerizate of acrylate monomer(s), a crosslinking amount of anhydrous acrylic anhydride and/or anhydrous methacrylate anhydride and a photochromic amount of pyrido benzoxazine. Depending on the amount of crosslinking agents and the other components selected to form the polymerizate, the polymerizate will exhibit improved temperature stability with regard to photocolorability and/or prevention of activation in sunlight.

19 Claims, No Drawings

TEMPERATURE STABLE AND SUNLIGHT PROTECTED PHOTOCHROMIC ARTICLES

DESCRIPTION OF THE INVENTION

The present invention relates to more temperature stable and to sunlight protected photochromic compositions. More particularly, the present invention relates to a photochromic polymeric article wherein the active photochromic component comprises a pyrido benzoxazine-type compound, and the polymeric host comprises the polymerizate of acrylate and/or methacrylate monomer crosslinked with anhydrous acrylic anhydride and/or anhydrous methacrylic anhydride.

Photochromism is a reversible phenomenon exhibited by a compound which, when exposed to light radiation involving ultraviolet rays, such as the ultraviolet radiation in sunlight or the light of a mercury lamp, changes color and then returns to its original color if the ultraviolet radiation is discontinued or the compound is stored in the dark. In the colored state the photochromic compound is said to be activated. When activated, the light transmission properties of the photochromic compound change, absorbing more light than when unactivated. A quantification of the change in the light transmission property or photocolorability of the photochromic compound may be expressed as the percent activated absorption. Percent activated absorption is the amount of visible light absorbed by the activated photochromic article, which may be calculated by subtracting from 100 the percent of visible light transmitted.

As used in this description and claims, the term "temperature stable photochromic article" means that the percent activated absorption at 37° C. of the photochromic article is not less than 40 percentage units of the article's percent activated absorption at 15° C. For example, if the percent activated absorption at 15° C. is 88, than the percent activated absorption at 37° C., would be at least 48. As used in this description and claims, the term "sunlight protected photochromic article" means that the color of a photochromic article containing a pyrido benzoxazine-type compound as the sole photochromic component remains substantially unchanged in the presence of sunlight.

One of the observed features associated with photochromic polymeric articles containing a spirooxazine compound as the photochromic component is that the composition of the polymeric matrix influences the photocolorability of the spirooxazine compound. See U.S. Pat. No. 5,000,878 at column 1, lines 49-61. More specifically, the photocolorability of photochromic polymeric articles made with most conventional ophthalmic plastic materials show a strong temperature dependence such that as the temperature increases the photocolorability of the plastic article decreases. This temperature dependence is highly undesirable and acts to limit the successful utilization of photochromic compounds in applications where use temperatures are above room temperature, e.g., 21° C.

In another vein, a disadvantage of certain photochromic compounds that limits their application in security documents is that they are activated or become colored by the ultraviolet light in sunlight. As used in this description and claims, the term "security document" includes, but is not limited to documents, such as banknotes, passports and drivers' licenses, for which authentification or verification of authenticity may be desired. This disadvantage prevents utilization of these photochromic compounds in applications in which the security document would be exposed to sunlight. One potential resolution of this problem has been disclosed in International Patent Application WO 90/06539, wherein a security mark containing a photochromic compound is covered by a controlled absorption layer of a laser dye that absorbs the low intensity ultraviolet (UV) light typically found in sunlight. Activation of the photochromic compound is accomplished by using a UV light source of high intensity.

It has now been discovered that anhydrous acrylic anhydride and anhydrous methacrylic anhydride may be used to crosslink acrylate and methacrylate monomers to provide enhanced temperature stability and/or sunlight protection to photochromic articles containing pyrido benzoxazine-type compounds. The improved temperature stability of the photochromic articles of this invention permits the increased use of photochromic pyrido benzoxazine-type compounds in optical elements at elevated temperatures. As used herein, the term "optical element" includes articles, such as ophthalmic lenses, optical filters, sunglasses, ski goggles, window coatings and the like. The provision of sunlight protection for security documents by this invention eliminates the need for a coating that absorbs low intensity UV radiation.

DETAILED DESCRIPTION OF THE INVENTION

Acrylate monomers that may be used to prepare the polymerizate described herein may be represented by the following graphic Formula I:

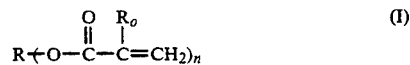

wherein $R_o$ is selected from the group consisting of hydrogen and methyl, R is selected from the group consisting of $C_1$-$C_{20}$ alkyl, $C_2$-$C_{20}$ ethylenically unsaturated alkyl (alkenyl), $C_5$-$C_8$ cycloalkyl, phenyl, substituted phenyl, phenyl ($C_1$-$C_9$) alkyl, substituted phenyl ($C_1$-$C_9$) alkyl, phenoxy ($C_1$-$C_9$) alkyl, substituted phenoxy ($C_1$-$C_9$) alkyl, hydroxy ($C_1$-$C_4$) alkyl, $C_1$-$C_4$ alkoxy ($C_1$-$C_4$) alkoxy ($C_2$-$C_4$) alkyl, $C_2$-$C_4$ oxiranyl, $C_1$-$C_8$ amino alkyl and $C_1$-$C_4$ alkoxy ($C_2$-$C_4$) alkyl. The phenyl substituents may be represented by $X_m$, wherein X is selected from the group consisting of $C_1$-$C_9$ alkyl, cyano, chloro, bromo, methoxy, nitro, amino, and methylthio, m is selected from the integers 1-5, and n is selected from the integers 1-4. Preferably $R_o$ is methyl, R is $C_1$-$C_8$ alkyl, $C_1$-$C_2$ alkoxy ($C_1$-$C_2$) alkoxy ($C_2$-$C_4$) alkyl and $C_1$-$C_2$ alkoxy $C_2$-$C_4$ alkyl, and n is selected from the integers 1-2.

Examples of acrylate monomers wherein R is a $C_1$-$C_{20}$ alkyl group include methyl methacrylate, ethyl methacrylate, propyl methacrylate, isopropyl methacrylate, butyl methacrylate, isobutyl methacrylate, hexyl methacrylate, 2-ethylhexyl methacrylate, nonyl methacrylate, lauryl methacrylate, stearyl methacrylate, isodecyl methacrylate, ethyl acrylate, methyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, isodecyl acrylate and the like.

Examples of acrylate monomers wherein R is a $C_2$-$C_{20}$ alkenyl include ethylene methacrylate, propylene methacrylate, isopropylene methacrylate, butane methacrylate, isobutylene methacrylate, hexene methacrylate, 2-ethylhexene methacrylate, nonerie methacrylate, isodecene methacrylate, ethylene acrylate, propylene acrylate, isopropylene acrylate, butane acrylate, isobutylene acrylate, hexene acrylate, 2-ethylhexene acrylate, nonerie acrylate, isodecene acrylate and the like.

Examples of $C_5$–$C_8$ cycloalkyl acrylate monomers include cyclopentyl methacrylate, 4-methyl cyclohexyl methacrylate, cyclopentyl acrylate, cyclohexyl acrylate, 4-methyl cyclohexyl acrylate and the like. Examples of the group consisting of phenyl, substituted phenyl, phenyl ($C_1$–$C_9$) alkyl, substituted phen ($C_1$–$C_9$) alkyl, phenoxy ($C_1$–$C_9$) alkyl and substituted phenoxy ($C_1$–$C_9$) alkyl monomers include benzyl methacrylate, o-bromobenzyl methacrylate, phenyl methacrylate, nonylphenyl methyacrylate, and benzyl acrylate, o-bromobenzylacrylate, phenyl acrylate and nonylphenyl acrylate, phenethyl methacrylate, phenoxy methacrylate, phenylpropyl methacrylate, p-aminophenoxy methacrylate, nonylphenethyl methacrylate, phenethyl acrylate, phenoxy acrylate, phenylpropyl acrylate, p-aminophenoxy acrylate, nonylphenethyl acrylate and the like.

Examples of hydroxyalkyl acrylates and hydroxyalkyl methacrylates include 2-hydroxyethyl acrylate, 2-hydroxypropyl acrylate, 4-hydroxybutyl acrylate, 2-hydroxyethyl methacrylate, 2-hydroxypropyl methacrylate, 4-hydroxybutyl methacrylate and the like. Examples of alkoxy alkoxy alkyl monomers include 2-ethoxyethoxymethyl methacrylate, ethoxyethoxyethyl methacrylate, 2-ethoxyethoxymethyl acrylate, 2-ethoxyethoxyethyl acrylate and the like. Examples of oxiranyl methacrylates and oxiranyl acrylates include glycidyl methacrylate, glycidyl acrylate, 2,3-epoxybutyl methacrylate, 2,3-epoxybutyl acrylate, 3,4-epoxybutyl methacrylate, 3,4-epoxybutyl acrylate, 2,3-epoxypropyl methacrylate, 2,3-epoxypropyl acrylate and the like.

Examples of amino alkyl methacrylates and amino alkyl acrylates include 2-(dimethylamino)ethyl methacrylate, 2-(diethylamino)ethyl methacrylate, 2-(dibutylamino)ethyl methacrylate, 3-(diethylamino)propyl methacrylate, 2-(dimethylamino)ethyl acrylate, 2-(diethylamino)ethyl acrylate, 2-(dibutylamino)ethyl acrylate, 3-(diethylamino)propyl acrylate and the like. Examples of alkoxy alkyl methacrylates and alkoxyalkyl acrylates include 2-methoxyethyl methacrylate, 2-ethoxyethyl methacrylate, 2-butoxyethyl methacrylate, 2-methoxyethyl acrylate, 2-ethoxyethyl acrylate, 2-butoxyethyl acrylate, tetrahydrofurfuryl acrylate, tetrahydrofurfuryl methacrylate and the like.

The acrylate and methacrylate monomers described above may be polymerized alone to produce homopolymers or in various combinations to produce copolymers, terpolymers, etc. Additional comonomers may be added in an amount up to 30 parts per hundred on a weight basis of the total of the monomer(s) (phm) used, which total includes the acrylate and methacrylate monomers, any additional comonomers added, and the crosslinking agent. Preferably, from 5 to 15 phm of comonomer may be added.

Examples of comonomers include copolymerizable polyfunctional acrylate monomers such as ethoxylated bisphenol-A-dimethacrylate, ethylene glycol diacrylate, ethylene glycol dimethacrylate, 1,2-propane diol diacrylate, 1,3-propane diol diacrylate, 1,2-propane diol dimethacrylate, 1,3-propane diol dimethacrylate, 1,4-butane diol diacrylate, 1,3-butane diol dimethacrylate, 1,4-butane diol dimethacrylate, 1,5-pentans diol diacrylate, 2,5-dimethyl-1,6-hexane diol dimethacrylate, diethylene glycol diacrylate, diethylene glycol dimethacrylate, triethylene glycol dimethacrylate, trimethylol propane trimethacrylate, tetraethylene glycol diacrylate, tetraethylene glycol dimethacrylate, dipropylene glycol diacrylate, dipropylene glycol dimethacrylate, trimethylol propane triacrylate, glycerol triacrylate, glycerol trimethacrylate, pentaerythritol triacrylate, pentaerythritol dimethacrylate, pentaerythritol tetraacrylate, pentaerythritol tetramethacrylate and mixtures of such acrylate monomers.

Further comonomers may be selected from the group of copolymerizable monomeric materials containing a vinyl group other than the vinyl monomers mentioned above. Examples of such materials include vinyl aromatic compounds such as styrene, alpha-methyl styrene, and alpha-chloro styrene. Other additives that may be present in the polymerizable composition are those which are conventionally used in casting compositions, such as UV absorbers, hindered amine light stabilizers, antioxidants, anticoloring agents and cure modifiers. These additives are used in conventional amounts known to those skilled in the art.

The crosslinking agent(s) used in the preparation of the polymerizates of the present invention are anhydrous methacrylic anhydride and anhydrous acrylic anhydride. These agents are used in a "crosslinking amount", i.e., an amount that is sufficient to cause crosslinking of the monomer(s), i.e., to form a thermoset resin. The actual amount of the crosslinking agent used may vary and will depend on the desired result, i.e., temperature stability or sunlight protection, and to a certain degree on the selected components, i.e., the monomer(s) and photochromic compound(s).

In general terms, the amount of crosslinking agent that may be used to provide sunlight protection to the photochromic article is within the range of 12 to 50 phm and more particularly 15 to 25 phm. The amount of crosslinking agent that may be used to provide temperature stability to the photochromic article is within a range of 1 to 50 phm and more particularly 10 to 20 phm.

Since there is an overlap of the crosslinking agent ranges, some photochromic articles may have both properties of sunlight protection and temperature stability. The amount of crosslinking agent that will achieve the optimal desired result, i.e. the highest level of sunlight protection and/or temperature stability may be readily ascertained by those skilled in the art by selecting a determined level of crosslinking agent within the described ranges and observing the result.

Photochromic pyrido benzoxazine-type compounds that may be used to prepare the photochromic articles of the present invention are spiro(benzindoline) pyrido benzoxazines and spiro(indoline) pyrido benzoxazines. Photochromic spiro(benzindoline) pyrido benzoxazines are described in U.S. Pat. No. 4,931,219 and may be represented by the following graphic formula II:

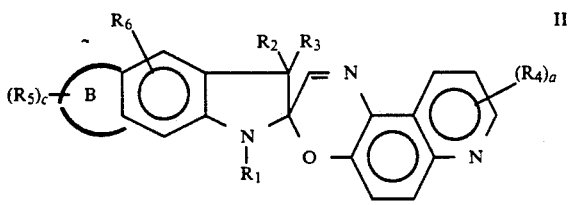

wherein:
(a) B is a benzene ring fused at the e or g face;
(b) $R_1$ is selected from the group consisting of $C_1-C_8$ alkyl, phenyl, phenyl($C_1-C_4$)alkyl, naphthyl($C_1-C_4$)alkyl, allyl, acrylyl($C_2-C_6$)alkyl, methacrylyl($C_2-C_6$)alkyl, carboxy($C_2-C_6$)alkyl, cyano($C_2-C_6$)alkyl, $C_1-C_4$ acyloxy($C_2-C_6$)alkyl, hydroxy($C_2-C_6$)alkyl, ($C_2H_4O$)m•$CH_3$, wherein m is a number of from 1 to 6, and mono- and disubstituted phenyl, said phenyl substituents being selected from the group consisting of $C_1-C_5$ alkyl and $C_1-C_5$ alkoxy;
(c) $R_2$ and $R_3$ are each selected from the group consisting of $C_1-C_5$ alkyl, phenyl, mono- and disubstituted phenyl, benzyl, and $R_2$ and $R_3$ taken together form a cyclic ring selected from the group consisting of an alicyclic ring containing from 6 to 8 carbon atoms which includes the spiro carbon atom, norbornyl and adamantyl and the aforesaid phenyl substituents are selected from the group consisting of $C_1-C_5$ alkyl and $C_1-C_5$ alkoxy radicals;
(d) each $R_4$ is selected from the group consisting of $C_1-C_5$ alkyl, $C_1-C_5$ alkoxy, and halogen, said halogen being selected from the group consisting of chloro, fluoro, iodo and bromo;
(e) each $R_5$ is selected from the group consisting of $C_1-C_5$ alkyl, halogen, said halogen being selected from the group consisting of chloro, fluoro, iodo and bromo, $C_1-C_5$ alkoxy, nitro, cyano, $C_1-C_4$ monohaloalkyl, $C_1-C_4$ polyhaloalkyl, $C_1-C_8$ alkoxycarbonyl, and $C_1-C_4$ acyloxy;
(f) $R_6$ is selected from the group consisting of hydrogen, halogen, $C_1-C_5$ alkyl, $C_1-C_5$ alkoxy, $C_1-C_4$ monohaloalkyl, $C_1-C_2$ polyhaloalkyl, cyano and $C_1-C_8$ alkoxycarbonyl; and
(g) a is an integer of from 0 to 2 and c is an integer of from 0 to 4.

Photochromic spiro(indoline) pyrido benzoxazines are described in U.S. Pat. Nos. 4,637,698 and 5,066,818 and may be represented by the following graphic Formula III:

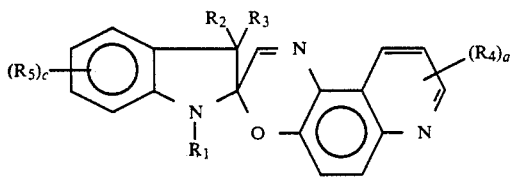

wherein $R_1$, $R_2$, $R_3$, $R_4$, $R_5$, a and c are the same as defined with respect to graphic formula II.

It is contemplated that photochromic pyrido benzoxazine-type compounds known and presently unknown, may be used in the present invention. The amount of the photochromic substance(s) added to the polymerizate may vary and will depend on the solubility of the photochromic substance(s) in the monomer mixture. Typically, a sufficient amount of the photochromic substance is added so that the resulting polymerizate is photochromic, i.e., produces a photochromic effect. By photochromic or photochromic effect is meant that when the photochromic polymerizate is exposed to ultraviolet light, the particles visibly change color (or become colored) and then return to the original color or color state when the ultraviolet light is removed. The amount of photochromic substance(s) incorporated within the polymerizate will very from a lower limit which is that minimum amount that will still provide a photochromic effect, to an upper limit, which is defined by. the solubility of the photochromic substance(s) in the monomer mixture and resulting polymerizate. Generally, the amount of photochromic substance(s) incorporated into the polymerizate may vary from about 0.01 to 20 phm.

In addition to the pyrido benzoxazine-type compounds, other photochromic dyes may be included in the temperature stable and/or sunlight protected polymerizate. These additional dyes may be any suitable organic photochromic compound that provides a measurable photochromic response when incorporated in the polymerizate and exposed to a source of activating light and is chemically compatible with the polymerizate and pyrido benzoxazine-type compound. Generally, the total amount of pyrido benzoxazine-type compound and additional photochromic substance(s) (if used) incorporated into the photochromic article may very from 0.01 to 20 phm.

Photochromic compounds that may be used in combination with the pyrido benzoxazine-type compounds may be selected from a variety of classes of known photochromic compounds. Particularly contemplated classes of photochromic compounds that may be used include: other spiro(indoline)-type compounds such as spiro(indoline)naphthoxazines, spiro(benzindoline)naphthoxazines, spiro(benzindoline)naphthopyrans, spiro(indolino)benzopyrans, spiro(indoline)benzoxazines, spiro(benzindoline)benzoxazines, chromenes, e.g., benzopyrans and naphthopyrans, metal dithizonate compounds, fulgides or fulgimidas and spiro(di)hydroindolizines.

Polymerization of the polymerizable composition comprising the acrylate monomer(s), comonomer(s) crosslinking agent(s) and photochromic compound(s) may be performed using conventional non-aqueous polymerization techniques that are used for acrylate-type monomers, e.g., bulk polymerization. A considerable body of literature concerned with polymerization of acrylic monomers has been developed, and the processes described in such literature may be used to perform the polymerizations described herein.

Initiators that may be used for bulk polymerization of acrylate monomers to produce the polymerizates of the present invention are initiators that do not oxidize or deleteriously affect the photochromic compound(s). An example of a suitable initiator is the azo-type initiator, e.g., 2,2'-azobis(isobutyronitrile), 2,2'-azobis(2-methylbutyronitrile), 2,2'-azobis(2-methylbutyronitrile, 2,2'-azobis(2-methylvaleronitrile, and the like.

The exact polymerization process used will be governed by the physical form, i.e., film, sheet, cast lens, etc., of the photochromic article desired and by the photochromic substance which is to be incorporated into the photochromic article. It is also necessary that the resulting photochromic polymerizate be permeable to ultraviolet and visible light. For example, a polymerization process should be used which does not utilize procedures or materials that will decompose or occlude ultraviolet and visible light from the photochromic substance and thereby nullify the reversible color changeability of that substance, i.e., if a particular polymerization process requires the use of ingredients to which the photochromic substance is sensitive, then a different process should be utilized. The same is true of polymerization processes requiring conditions of high temperature, solvent, etc.

An application of the sunlight protected photochromic article is as a coating on security documents for the authentication or verification of such documents. Such a coating may be applied to the entire document or to a small section which would be considered a mark for verification. Security documents for which authentication may be desired include but are not limited to bank notes, currency, stock certificates, bonds, visas, passports, stamps, driver's licenses, permits, tickets, credit cards, cash withdraw cards, check cards, access cards, traveler's checks, bank checks and remote access control cards. Security documents may be made from materials that are woven or nonwoven, cellulosic or polymeric or mixtures of these types of materials.

It is contemplated that security documents may be used to label or tag articles of commerce. Articles of commerce for which verification of authenticity is important may include building materials, labels for clothing, food, drug or medicinal packaging, machine parts, business equipment, components of manufacturer, pharmaceutical, toys, etc. In addition to serving as a means for verification, security documents used as labels may be attached to an object to indicate its nature, contents, ownership, destination, etc.

In the case of a sunlight protected photochromic article, one contemplated embodiment is the use of the material to form a plastic card or a laminate on a plastic card. A further embodiment is the use of the polymerizate to form a label or tag that can be used for authentication of the article. A still further embodiment is the use of a pigmentary form of the photochromic article in ink used to print security documents. A pigmentary form of the photochromic article may be produced by granulating and grinding the polymerizate into particles of desired pigment size. Use of the photochromic article as a pigment enables incorporation into any suitable vehicle that is permeable to ultraviolet light and visible light or used in any application where pigmentary materials are utilized.

Applications that may use the improved temperature stable photochromic article include optical elements, such as ophthalmic lenses, optical filters, sunglasses, ski goggles, window coatings and the like. One embodiment of the temperature stable photochromic article is the use of the polymerizate as a cast ophthalmic lens. A further embodiment is the use of the polymerizate as a coating on a plastic or in combination with a glass ophthalmic lens.

According to one exemplification of the sunlight protected photochromic article, approximately 35 grams (g.) of methyl methacrylate, 15 g. of anhydrous methacrylic anhydride, 0.0245 g. of 1,3-dihydro-1,3,3,4,5, (or 1,3,3,5,6) pentamethyl spiro(2H-indole-2,3'-[3H]pyrido{3,2-f}(1,4) benzoxazine and 0.02 g. of azoisobutyronitrile initiator is added to a glass vessel and mixed. The resulting mixture is poured between 2 clamped glass plates separated by a 2.2 millimeter gasket, placed in a water bath and subjected to a 26 hour polymerization cycle during which time the bath temperature is increased from 37° C. to 92° C. After the cycle is completed, the resulting sheet is recovered by demolding.

The sheet may be granulated and ground by conventional pulverizing equipment such as hammer mills, ball mills and micronizers to an average particle size diameter in the range of between 0.25 and about 20 micrometers, more particularly, 0.25 to 5.0 micrometers. 5 percent of the pigmentary form of the photochromic article on a weight basis may be added to a clear coating, such as multi-purpose clear ink, MP-170, available from Ink Dezyne International Ltd., Toronto, Ontario, Canada. A portion of a driver's license may be coated with the material. Exposure of the coated driver's license to 365 nm UV light would show a dark blue coloration where it was coated. After the photochromic returned to the unactivated colorless state, exposure of the same license to sunlight would not show any coloration change.

The photochromic article that is temperature stable is prepared in the same fashion as described above except that 42.5 g. of methyl methacrylate and 7.5 g. of anhydrous methacrylic anhydride is used and the mixture cast in a lens mold. The resulting lens colors to a blue shade at 37° C. and has a percent activated absorption of approximately 62. Such a lens may be used as a sun lens.

The present process is more particularly described in the following examples which are intended as illustrative only, since numerous modifications and variations therein will be apparent to those skilled in the art.

The photochromic compounds used in the following examples are more fully described in Table I.

TABLE I

| Photochromic Compound | Chemical Name |
| --- | --- |
| A | 1,3-dihydro-1,3,3,4,5(or 1,3,3,5,6)-pentamethyl spiro [2H-indole-2,3'-[3H]pyrido{3,2-f}(1,4) benzoxazine |
| B | 1'3'-dihydro-5,7-dimethoxy-3'-ethyl-1'-propyl-3',4',5'-trimethyl-spiro[2H-1,4-benzoxazine-2,2'[2H]indole] |
| C | 1,3-dihydro-3,3-dimethyl-5-methoxy-1-propyl spiro [2H-indole-2,3'-[3H]pyrido-{3,2-f}(1,4) benzoxazine] |
| D | 1,3-dihydro-1-propyl-3,3,5,6-tetramethyl spiro [2H-indole-2,3'-[3H]pyrido-{3,2-f}(1,4) benzoxazine] |
| E | 1,3-dihydro-9'-methoxy-1,3,3,4,5(or 1,3,3,5,6) pentamethyl-spiro[2H-indole-2,3'-[3H]naphth[2,1-b][1,4] oxazine] |
| F | 5-acetoxy-3-(2-flux:ro)phenyl-3-(3,4-dimethoxy) phenyl-3H:aphtho[2,1-b]pyran |

EXAMPLE 1

The polymerizates were made by adding the amount and type of monomer and the amount and type of cross-linking agent recited in Table II to a glass vessel. To this mixture was added 0.02 grams (g.) of azoisobutyronitrile (AIBN) initiator and the amount and type of photochromic compound. The resulting mixture was poured between 2 clamped glass plates which were separated by a 2.2 millimeter gasket. The clamped plates were placed in a water bath and subjected to a 26-hour polymerization cycle, during which time the bath temperature was increased from 39° C. to 92° C. After the polymerization cycle was completed, the resulting sheets were recovered by demolding and were cut into 6.35 centimeter squares. The sheets were examined for coloration after exposure to direct sunlight at a 0° exposure angle for more than 5 minutes and after exposure to direct UV radiation for more than 5 minutes under a Spectroline XX-15A 365 nm UV lamp. Results are tabulated in Table III.

color. Results for Sample 10 showed that 7.5 g. (15 phm) of anhydrous methacrylic anhydride in n-butyl acrylate containing Photochromic A effectively prevented coloration in the sunlight.

TABLE II

| Sample No. | Amount and Type of Monomer | Amount and Type of Crosslinking Agent* | Amount and Type of Photochromic Compound |
|---|---|---|---|
| 1. | 40.0 g. n-hexlmethacrylate | 10.0 g. methacrylic anhydride | 0.0245 g. of A |
| 2. | 47.5 g. n-hexlmethacrylate | 2.5 g. methacrylic anhydride | 0.0245 g. of A |
| 3. | 35.0 g. ethoxyethoxyethyl methacrylate | 15.0 g. methacrylic anhydride | 0.0245 g. of A |
| 4. | 42.5 g. ethoxyethoxyethyl methacrylate | 7.5 g. methacrylic anhydride | 0.0245 g. of A |
| 5. | 35.0 g. methyl methacrylate | 15.0 g. methacrylic anhydride | 0.0245 g. of A |
| 6. | 40.0 g. methyl methacrylate | 10.0 g. methacrylic anhydride | 0.0245 g. of A |
| 7. | 25.0 g. ethyl methacrylate, 22.0 g. n-hexlmethacrylate | 3.0 g. methacrylic anhydride | 0.01 g. of B 0.01 g. of C |
| 8. | 47 g. ethyl methacrylate | 3.0 g. methacrylic anhydride | 0.01 g. of B 0.01 g. of C |
| 9. | 35 g. ethyl methacrylate | 15 g. ethylene glycol dimethacrylate | 0.01 g. of B 0.01 g. of C |
| 10. | 42.5 g. n-butyl acrylate | 7.5 g. methacrylic anhydride | 0.0245 g. of A |

*Anhydrous methacrylic anhydride was used as a crosslinking agent in all experiments except Sample 9.

TABLE III

| Sample No. | Coloration After Exposure to Direct Sunlight For >5 Minutes | Coloration After Exposure to Direct UV For >5 Minutes |
|---|---|---|
| 1 | No Visible Color | Dark Blue |
| 2 | Dark Blue | Dark Blue |
| 3 | No Visible Color | Dark Blue |
| 4 | Slight Blue | Dark Blue |
| 5 | No Visible Color | Dark Blue |
| 6 | Dark Blue | Dark Blue |
| 7 | Slight Buue | Dark Blue |
| 8 | Slight Blue | Dark Blue |
| 9 | Dark Blue | Dark Blue |
| 10 | No Visible Color | Dark Blue |

In each of the sample pairs, 1 and 2, 3 and 4, and 5 and 6, varying amounts of the same monomer and crosslinking agent were used. The level of methacrylic anhydride necessary to prevent coloration in the sunlight was 10 g. (20 phm) in sample 1 and 15 g. (30 phm) in samples 3 and 5. This shows that different monomers may require different levels of methacrylic anhydride to obtain desired results. Sample 7 illustrates the results of a mixed monomer and mixed photochromic system in which a level of 3 g. (6 phm) of anhydrous methacrylic anhydride caused a significant reduction in the final color to a slight blue in sunlight. Comparison of results for samples 8 and 9 revealed the ineffectiveness of using a different crosslinking agent; namely, ethylene glycol dimethacrylate. This crosslinking agent had no detectable effect at a level of 15 g. (30 phm) in Sample 9 whereas anhydrous methacrylic anhydride at a level of 3 g. (6 phm) in Sample 8 yielded a significantly reduced

EXAMPLE 2

The polymerizates were made by adding the amount and type of monomer and the amount and type of crosslinking agent recited in Table IV to a glass vessel. Further preparation of the polymerizate was done in the same manner as described in Example 1.

The 6.35 centimeter square photochromic polymerizates were placed in a glove box and cooled to less than 15° C. over a period of two hours. During this time, the samples were continuously irradiated with UV light from a Spectroline XX-15A 365 nm UV light source. Air was continuously circulated through the box. After the 2-hour cooling/activation period was completed, the temperature of the air flowing through the box was slowly increased. The sample temperatures were measured on the surface of the square photochromic polymerizate. The absorption of the activated samples was determined immediately afterwards using the visible spectrum path of a Hoya ULT 6000 light meter in which both the ultraviolet and infrared paths were blocked to prevent sample stimulation and heating respectively. Samples were slowly warmed from less than 15° C. to 37° C. over a period of more than two hours. Absorption measurements were periodically determined during this warming cycle. After completion of the temperature cycle, the samples were removed and put into the dark to deactivate for a period in excess of 18 hours. All runs were replicated on separate days to ensure reproducibility. The samples were evaluated for the effects of elevated temperature on the percent activated absorption. Results are tabulated in Table V.

TABLE IV

| Sample No. | Amount and Type of Monomer | Amount and Type of Crosslinking Agent | Amount and Type of Photochromic Compound |
|---|---|---|---|
| 11 | 42.5 g. Ethylmethacrylate | 7.5 g. Ethylene glycol dimethacrylate | 0.245 g. of A |
| 12 | 42.5 g. Ethylmethacrylate | 7.5 g. Methacrylic Anhydride | 0.245 g. of A |
| 13 | 42.5 g. Ethylmethacrylate | 7.5 g. Ethylene glycol dimethacrylate | 0.245 g. of D |
| 14 | 42.5 g. Ethylmethacrylate | 7.5 g. Methacrylic Anhydride | 0.245 g. of D |
| 15 | 42.5 g. Ethylmethacrylate | 7.5 g. Ethylene glycol dimethacrylate | 0.245 g. of E |
| 16 | 42.5 g. Ethylmethacrylate | 7.5 g. Methacrylic Anhydride | 0.245 g. of E |
| 17 | 42.5 g. Ethylmethacrylate | 7.5 g. Ethylene glycol dimethacrylate | 0.245 g. of F |
| 18 | 42.5 g. Ethylmethacrylate | 7.5 g. Methacrylic Anhydride | 0.245 g. of F |
| 19 | 45.0 g. Ethylmethacrylate | 5.0 g. Ethylene glycol dimethacrylate | 0.245 g. of B |
| 20 | 45.0 g. Ethylmethacrylate | 5.0 g. Methacrylic Anhydride | 0.245 g. of B |
| 21 | 42.5 g. Ethylmethacrylate | 7.5 g. Methacrylic Anhydride | 0.245 g. of A |

TABLE IV-continued

| Sample No. | Amount and Type of Monomer | Amount and Type of Crosslinking Agent | Amount and Type of Photochromic Compound |
|---|---|---|---|
| 22 | 42.5 g. Ethylmethacrylate | 7.5 g. Ethylene glycol dimethacrylate | 0.245 g. of A |
| 23 | 42.5 g. Ethylmethacrylate | 7.5 g. Diethylene glycol dimethacrylate | 0.245 g. of A |
| 24 | 42.5 g. Ethylmethacrylate | 7.5 g. Triethylene glycol dimethacrylate | 0.245 g. of A |
| 25 | 42.5 g. Ethylmethacrylate | 7.5 g. Tetraethylene glycol dimethacrylate | 0.245 g. of A |
| 26 | 42.5 g. Ethylmethacrylate | 7.5 g. Methacrylic Anhydride | 0.245 g. of A |
| 27 | 40.0 g. Ethylmethacrylate | 7.5 g. Methacrylic Anhydride | 0.245 g. of A |
| 28 | 40.0 g. Ethylmethacrylate | 7.5 g. Methacrylic Anhydride | 0.245 g. of A |
| 29 | 37.5 g. Ethoxyethyl-methacrylate | 7.5 g. Methacrylic Anhydride | 0.245 g. of A |
| 30 | 35.0 g. Ethoxyethoxyethyl-methacrylate | 7.5 g. Methacrylic Anhydride | 0.245 g. of A |
| 31 | 42.5 g. Ethylmethacrylate | 7.5 g. Methacrylic Anhydride | 0.245 g. of A |
| 32 | 40.0 g. Ethylmethacrylate | 7.5 g. Methacrylic Anhydride | 0.245 g. of A |
| 33 | 37.5 g. Ethylmethacrylate | 7.5 g. Methacrylic Anhydride | 0.245 g. of A |
| 34 | 42.5 g. Ethylmethacrylate | 7.5 g. Methacrylic Anhydride | 0.245 g. of D |
| 35 | 40.0 g. Ethylmethacrylate | 7.5 g. Methacrylic Anhydride | 0.245 g. of D |
| 36 | 37.5 g. Ethylmethacrylate | 7.5 g. Methacrylic Anhydride | 0.245 g. of D |
| 37 | 35.0 g. Ethylmethacrylate | 7.5 g. Methacrylic Anhydride | 0.245 g. of D |

| Sample No. | % Activated Absorption @ | | |
|---|---|---|---|
| | 15° C. | 25° C. | 37° C. |
| 11 | 73 | 59 | 26 |
| 12 | 88 | 78 | 57 |
| 13 | 79 | 66 | 34 |
| 14 | 83 | 75 | 50 |
| 15 | 80 | 61 | 31 |
| 16 | 83 | 59 | 25 |
| 17 | 50 | 44 | 37 |
| 18 | 54 | 46 | 35 |
| 19 | 73 | 61 | 28 |
| 20 | 47 | 34 | 25 |
| 21 | 88 | 78 | 57 |
| 22 | 73 | 59 | 26 |
| 23 | 76 | 58 | 26 |
| 24 | 74 | 54 | 22 |
| 25 | 74 | 54 | 25 |
| 26 | 84 | 78 | 62 |
| 27 | 83 | 75 | 62 |
| 28 | 93 | 83 | 57 |
| 29 | 92 | 86 | 63 |
| 30 | 90 | 87 | 68 |
| 31 | 88 | 78 | 57 |
| 32 | 83 | 75 | 62 |
| 33 | 77 | 69 | 55 |
| 34 | 83 | 75 | 50 |
| 35 | 86 | 78 | 60 |
| 36 | 85 | 81 | 62 |
| 37 | 75 | 71 | 56 |

Of the polymerizates in samples 11–20, those containing pyrido benzoxazine photochromic compounds crosslinked with anhydrous methacrylic anhydride (Samples 12 and 14) showed the highest percent activated absorption levels at 37° C. The polymerizates which had a significantly lower percent activated absorption level at 37° C. were those crosslinked with ethylene glycol dimethacrylate and those crosslinked with anhydrous methacrylic anhydride containing photochromic compounds not of the pyrido benzoxazine type, i.e., compounds B, E and F. This indicates that the benefit of enhanced temperature stability provided by anhydrous methacrylic anhydride did not extend to the spiro benzoxazine, naphthoxazine and naphthopyran tested.

In samples 21–25, the highest percent activated absorption at 37° C. was found with anhydrous methacrylic anhydride as the crosslinking agent. Increasing the carbon length of the crosslinking agent from that of ethylene glycol dimethacrylate in Sample No. 22 to tetraethylene glycol dimethacrylate in Sample No. 25 did not cause an increase in the percent activated absorption at 37° C.

In samples 26–30, the results show that different amounts of methacrylic anhydride are required to yield the highest percent activated absorption levels for different monomers. The amount of anhydrous methacrylic anhydride necessary to yield the highest percent activated absorption at 37° C. for Samples 27, 29 and 30 correspondingly increased with the increasing size of side chain on the monomer.

The results for samples 31–37 indicates that different levels of anhydrous methacrylic anhydride were necessary to yield the highest percent activated absorption for different pyrido benzoxazine-type photochromic compounds. Also indicated was an optimum level of anhydrous methacrylic anhydride for both pyrido benzoxazines tested, above which an increase in percent activated absorption did not occur.

Although the present invention has been described with reference to specific details of certain embodiments thereof, it is not intended that such details should be regarded as limitations upon the scope of the invention except as and to the extent that they are included in the accompanying claims.

We claim:
1. A photochromic article comprising:
   (a) the polymerizate of
      i. at least one monomer selected from monomers represented by the graphic formula,

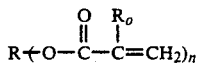

wherein $R_o$ is selected from the group consisting of hydrogen and methyl, R is selected from the group consisting of $C_1$-$C_{20}$ alkyl, $C_2$-$C_{20}$ ethylenically unsaturated alkyl(alkenyl), $C_5$-$C_8$ cycloalkyl, hydroxy ($C_1$-$C_4$) alkyl, $C_1$-$C_4$ alkoxy ($C_2$-$C_4$) alkyl, $C_2$-$C_4$ oxiranyl, $C_1$-$C_8$ amino alkyl, $C_1$-$C_4$ alkoxy ($C_1$-$C_4$) alkoxy ($C_2$-$C_4$) alkyl, phenyl, substituted phenyl, phenyl ($C_1$-$C_9$) alkyl, substituted phenyl ($C_1$-$C_9$) alkyl, phenoxy ($C_1$-$C_9$) alkyl and substituted phenoxy ($C_1$-$C_9$) alkyl, wherein the phenyl substituents are represented by $X_m$ and wherein X is selected from the group consisting of $C_1$-$C_9$ alkyl, cyano, chloro, bromo, methoxy, nitro, amino, methylthio and m is selected from the integers 1–5, and n is selected from the integers 1–4; and ii. a crosslinking amount of a material selected from the group consisting of anhydrous methacrylic anhydride, anhydrous acrylic anhydride, and mixtures of such anhydrides; and (b) a photochromic amount of a photochromic material selected from the group consisting of spiro(indoline) pyrido benzoxazine and spiro(benzindoline) pyrido benzoxazine, said polymerizate being permeable to ultraviolet and visible light.

2. The photochromic article of claim 1 wherein the photochromic pyrido benzoxazine compound is a spiro-(indoline) pyrido benzoxazine represented by the following graphic formula:

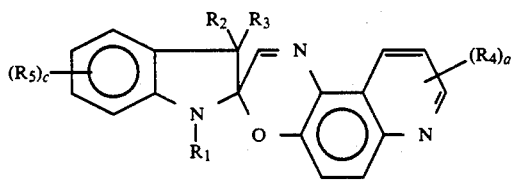

wherein:
(a) $R_1$ is selected from the group consisting of $C_1$-$C_8$ alkyl, phenyl, phenyl($C_1$-$C_4$)alkyl, naphthyl($C_1$-$C_4$)alkyl, allyl, acrylyl($C_2$-$C_6$)alkyl, methacrylyl($C_2$-$C_6$)alkyl, carboxy($C_2$-$C_6$)alkyl, cyano($C_2$-$C_6$)alkyl, $C_1$-$C_4$ acyloxy($C_2$-$C_6$)alkyl, hydroxy($C_2$-$C_6$)alkyl, ($C_2H_4O$)m•$CH_3$, wherein m is a number of from 1 to 6, and mono- and disubstituted phenyl, said phenyl substituents being selected from the group consisting of $C_1$-$C_5$ alkyl and $C_1$-$C_5$ alkoxy;

(b) $R_2$ and $R_3$ are each selected from the group consisting of $C_1$-$C_5$ alkyl, phenyl, mono- and disubstituted phenyl, benzyl, and $R_2$ and $R_3$ taken together form a cyclic ring selected from the group consisting of an alicyclic ring containing from 6 to 8 carbon atoms which includes the spiro carbon atom, norbornyl and adamantyl and the aforesaid phenyl substituents are selected from the group consisting of $C_1$-$C_5$ alkyl and $C_1$-$C_5$ alkoxy radicals;

(c) each $R_4$ is selected from the group consisting of $C_1$-$C_5$ alkyl, $C_1$-$C_5$ alkoxy, and halogen, said halogen being selected from the group consisting of chloro, fluoro, iodo and bromo;

(d) each $R_5$ is selected from the group consisting of $C_1$-$C_5$ alkyl, halogen, said halogen being selected from the group consisting of chloro, fluoro, iodo and bromo, $C_1$-$C_5$ alkoxy, nitro, cyano, $C_1$-$C_4$ monohaloalkyl, $C_1$-$C_4$ polyhaloalkyl, $C_1$-$C_8$ alkoxycarbonyl, and $C_1$-$C_4$ acyloxy; and (e) a is an integer of from 0 to 2 and c is an integer of from 0 to 4.

3. The photochromic article of claim 1 wherein the photochromic pyrido benzoxazine is a spiro(benzindoline) pyrido benzoxazine represented by the following graphic formula:

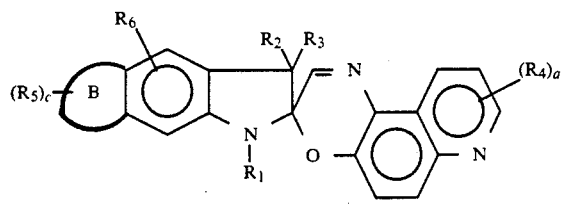

wherein:
(a) B is a benzene ring fused at the e or g face;
(b) $R_1$ is selected from the group consisting of $C_1$-$C_8$ alkyl, phenyl, phenyl($C_1$-$C_4$)alkyl, naphthyl($C_1$-$C_4$)alkyl, allyl, acrylyl($C_2$-$C_6$)alkyl, methacrylyl($C_2$-$C_6$)alkyl, carboxy($C_2$-$C_6$)alkyl, cyano($C_2$-$C_6$)alkyl, $C_1$-$C_4$ acyloxy($C_2$-$C_6$)alkyl, hydroxy($C_2$-$C_6$)alkyl, ($C_2H_4O$)m•$CH_3$, wherein m is a number of from 1 to 6, and mono- and disubstituted phenyl, said phenyl substituents being selected from the group consisting of $C_1$-$C_5$ alkyl and $C_1$-$C_5$ alkoxy;

(c) $R_2$ and $R_3$ are each selected from the group consisting of $C_1$-$C_5$ alkyl, phenyl, mono- and disubstituted phenyl, benzyl, and R2 and R3 taken together form a cyclic ring selected from the group consisting of an alicyclic ring containing from 6 to 8 carbon atoms which includes the spiro carbon atom, norbornyl and adamantyl and the aforesaid phenyl substituents are selected from the group consisting of $C_1$-$C_5$ alkyl and $C_1$-$C_5$ alkoxy radicals;

(d) each $R_4$ is selected from the group consisting of $C_1$-$C_5$ alkyl, $C_1$-$C_5$ alkoxy, and halogen, said halogen being selected from the group consisting of chloro, fluoro, iodo and bromo;

(e) each $R_5$ is selected from the group consisting of $C_1$-$C_5$ alkyl, halogen, said halogen being selected from the group consisting of chloro, fluoro, iodo and bromo, $C_1$-$C_5$ alkoxy, nitro, cyano, $C_1$-$C_4$ monohaloalkyl, $C_1$-$C_4$ polyhaloalkyl, $C_1$-$C_8$ alkoxycarbonyl, and $C_1$-$C_4$ acyloxy;

(f) $R_6$ is selected from the group consisting of hydrogen, halogen, $C_1$-$C_5$ alkyl, $C_1$-$C_5$ alkoxy, $C_1$-$C_4$ monohaloalkyl, $C_1$-$C_2$ polyhaloalkyl, cyano and $C_1$-$C_8$ alkoxycarbonyl; and (g) a is an integer of from 0 to 2 and c is an integer of from 0 to 4.

4. The photochromic article of claim 1 wherein the amount of crosslinking material in the polymerizate is from 1 to 50 parts per hundred parts of monomer.

5. The photochromic article of claim 4 wherein the photochromic pyrido benzoxazine compound is present in an amount of from about 0.01 to 20 parts per hundred parts of monomer.

6. The photochromic article of claim 5 wherein there is present in addition a photochromic amount of a further photochromic substance selected from the group consisting of spiro(indoline) napthoxazines, spiro(benzindoline) naphthoxazines, spiro(benzindoline) naphthopyrans, spiro(indoline) benzopyrans, spiro(indoline) naphthopyrans, spiro(indoline) quinopyrans, spiro(indoline) benzoxazines, spiro(benzindoline) benzoxazines, chromenos, metal dithizonate compounds, fulgides, fulgimides, spiro(di)hydroindolizines and mixtures of such photochromic compounds.

7. The photochromic article of claim 1 wherein the monomer is selected from the group consisting of methyl methacrylate, ethyl methacrylate, hexyl methacrylate, ethoxy ethyl methacrylate, ethoxy ethoxy ethyl methacrylate, n-butyl acrylate and mixtures of such monomers.

8. The photochromic article of claim 7 wherein the amount of crosslinking material in the polymerizate is from 12 to 50 parts per hundred parts of monomer, and said photochromic article remains substantially clear in the presence of sunlight.

9. The photochromic article of claim 8 wherein the amount of crosslinking material in the polymerizate is from 15 to 25 parts per hundred parts of monomer.

10. The photochromic article of claim 7 wherein the amount of crosslinking material in the polymerizate is from 1 to 50 parts per hundred parts of monomer, and said photochromic article exhibits temperature stability with regard to photocolorability.

11. The photochromic article of claim 10 wherein the amount of crosslinking material in the polymerizate is from 10 to 20 parts per hundred parts of monomer.

12. The photochromic article of claim 10 wherein the article is an optical element.

13. The photochromic article of claim 7 wherein the photochromic pyrido benzoxazine is a spiro(indoline) pyrido benzoxazine represented by the following graphic formula:

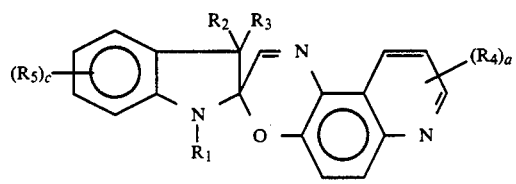

wherein:
(a) $R_1$ is selected from the group consisting of $C_1$-$C_8$ alkyl, phenyl, phenyl($C_1$-$C_4$)alkyl, naphthyl($C_1$-$C_4$)alkyl, allyl, acrylyl($C_2$-$C_6$)alkyl, methacrylyl($C_2$-$C_6$)alkyl, carboxy($C_2$-$C_6$)alkyl, cyano($C_2$-$C_6$)alkyl, $C_1$-$C_4$ acyloxy($C_2$-$C_6$)alkyl, hydroxy($C_2$-$C_6$)alkyl, $(C_2H_4O)m \bullet CH_3$, wherein m is a number of from 1 to 6, and mono- and disubstituted phenyl, said phenyl substituents being selected from the group consisting of $C_1$-$C_5$ alkyl and $C_1$-$C_5$ alkoxy;

(b) $R_2$ and $R_3$ are each selected from the group consisting of $C_1$-$C_5$ alkyl, phenyl, mono- and disubstituted phenyl, benzyl, and $R_2$ and $R_3$ taken together form a cyclic ring selected from the group consisting of an alicyclic ring containing from 6 to 8 carbon atoms which includes the spiro carbon atom, norbornyl and adamantyl and the aforesaid phenyl substituents are selected from the group consisting of $C_1$-$C_5$ alkyl and $C_1$-$C_5$ alkoxy radicals;

(c) each $R_4$ is selected from the group consisting of $C_1$-$C_5$ alkyl, $C_1$-$C_5$ alkoxy, and halogen, said halogen being selected from the group consisting of chloro, fluoro, iodo and bromo;

(d) each $R_5$ is selected from the group consisting of $C_1$-$C_5$ alkyl, halogen, said halogen being selected from the group consisting of chloro, fluoro, iodo and bromo, $C_1$-$C_5$ alkoxy, nitro, cyano, $C_1$-$C_4$ monohaloalkyl, $C_1$-$C_4$ polyhaloalkyl, $C_1$-$C_8$ alkoxycarbonyl, and $C_1$-$C_4$ acyloxy; and (e) a is an integer of from 0 to 2 and c is an integer of from 0 to 4.

14. The photochromic article of claim 13 wherein the amount of crosslinking material in the polymerizate is from 12 to 50 parts per hundred parts of monomer, and said photochromic article remains substantially clear in the presence of sunlight.

15. The photochromic article of claim 13 wherein the amount of crosslinking material in the polymerizate is from 1 to 50 parts per hundred parts of monomer, and said photochromic article exhibits temperature stability with regard to photocolorability.

16. The photochromic article of claim 14 wherein the photochromic pyrido benzoxazine compound is present in an amount of from about 0.01 to 20 parts per hundred parts of monomer.

17. The photochromic article of claim 15 wherein the photochromic pyrido benzoxazine compound is present in an amount of from about 0.01 to 20 parts per hundred parts of monomer.

18. An article in the form of a document having applied thereto the polymerizate of claim 8.

19. The article of claim 18 wherein the polymerizate is a mark on the document.

* * * * *